United States Patent [19]
Fussell

[11] Patent Number: 5,315,779
[45] Date of Patent: May 31, 1994

[54] FISH HABITAT

[76] Inventor: Don L. Fussell, 6209 Windfern, Houston, Tex. 77040

[21] Appl. No.: 29,537

[22] Filed: Mar. 11, 1993

[51] Int. Cl.⁵ .................. A01K 61/00; A01K 97/00
[52] U.S. Cl. ................................. 43/4; 441/23
[58] Field of Search ............... 43/4, 44.99, 1; 119/3; 441/23, 6, 1

[56] References Cited

U.S. PATENT DOCUMENTS

| | | | |
|---|---|---|---|
| 2,562,922 | 8/1951 | Kist | 441/6 |
| 2,961,994 | 11/1960 | Kopietz | 119/3 |
| 4,089,155 | 5/1963 | Bengtson | 441/23 |
| 4,916,845 | 4/1990 | Aydelette, Sr. | 43/4 |
| 5,048,219 | 9/1991 | Georgescu | 43/4 |
| 5,201,136 | 4/1993 | LaMorte et al. | 43/4 |

*Primary Examiner*—Paula A. Bradley
*Assistant Examiner*—Jeanne M. Elpel
*Attorney, Agent, or Firm*—Bush, Moseley & Riddle

[57] ABSTRACT

An artificial habitat assembly for fish or other aquatic life includes a series of vertically spaced plates or discs having a specified gravity less than 1.0, which are held adjacent the bottom of a body of water by an anchor and a flexible stress member to which the plates are attached in vertically spaced relationship. The plates provide areas of shade or darkness which are attractive to fish seeking shelter.

10 Claims, 1 Drawing Sheet

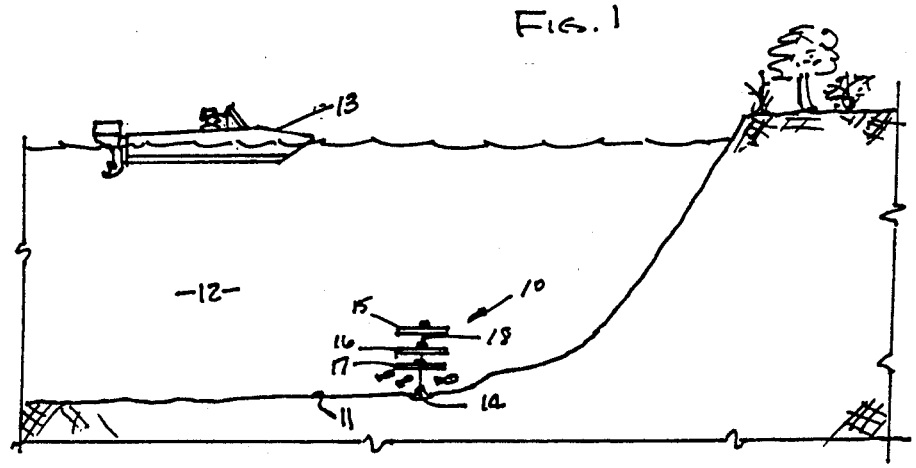
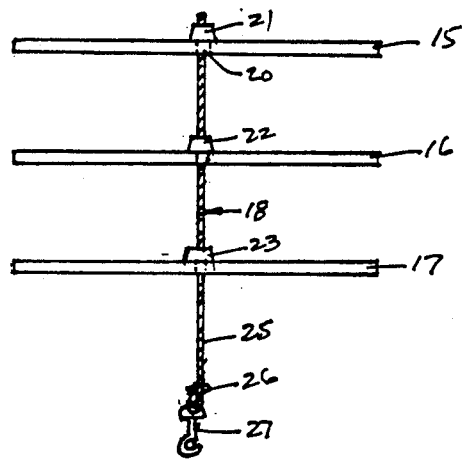
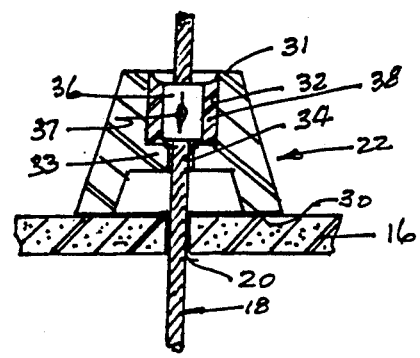
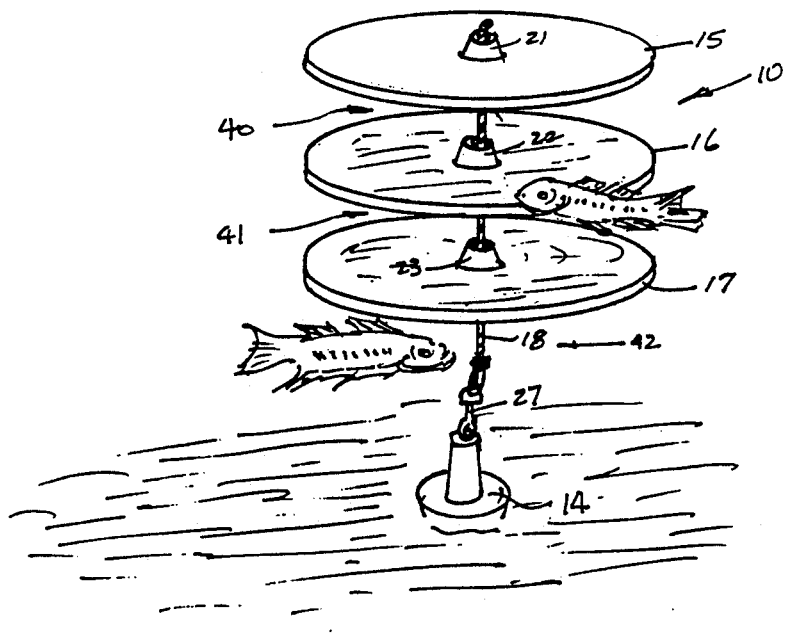

FISH HABITAT

FIELD OF THE INVENTION

This invention relates generally to an artificial habitat for fish or other aquatic life, and particularly to a fish habitat structure which can be easily carried to a site and then deployed. The habitat provides cover and shelter as well as shade and darkness that is attractive to fish.

BACKGROUND OF THE INVENTION

When lakes, reservoirs and other water impoundments are constructed, there are ground areas that have brush, trees, stumps and rocks which become natural underwater habitats for fish when the impoundment fills with water. These water bottom structures afford fish the cover and protection that they need. However in a few years the brush and any other prior vegetation will have rotted away, and even the rocks will have been covered up with mud and/or silt. Although some fisherman have been known to dump raw brush overboard in an effort to provide fresh habitat, this is troublesome and somewhat risky on account of the unwieldy nature of brush. Of course other fisherman are curious as to the presence or absence of fish at the spot where the brush was submerged.

A general object of the present invention is to provide a new and improved fish habitat which replaces, or adds to, rotted away vegetation.

Another object of the present invention is to provide a new and improved habitat of the type described which provides long term cover and shelter for aquatic life such as fish.

Yet another object of the present invention is to provide a new and improved fish habitat of the type described which can be safely transported by boat and deployed on the water bottom.

SUMMARY OF THE INVENTION

These and other objects are attained in accordance with the concepts of this invention through the provision of a habitat assembly including a lead one disc, and preferably a plurality of discs, that can be made of a relatively rigid, closed-cell foam plastic board having a specific gravity of less than 1.0 so as to tend to float in water. The discs are coupled in a vertically spaced stack by a stress member that passes through a hole in the center of each. The stress member is connected to each disc in a manner such that they float parallel to one another at certain intervals or distances. The stress member preferably is a nylon or stainless steel rope which will not rust or decompose under water. Each disc is connected to the stress member by a stop which includes a stainless steel lug or sleeve that is crimped to the stress member and fits into a block on the upper side of the disc. Alternatively, a plastic sleeve can be attached to the stress member and fit into such block. The lower end of the stress member can be formed into a loop, and a clip which engages the loop can be connected to an anchor or weight. Such anchor or weight engages the bottom and holds the assembly in place. The use of a flexible stress member to hold the discs in place allows the habitat assembly to collapse with the discs stacked on one another for easy transport in a fishing boat, as well as deployment over the side thereof. Once the anchor is in bottom, the flexible stress member also allows the discs to each seek a horizontal position due to the tendency to float upward, so that the assembly provides shade, darkness and shelter for fish.

BRIEF DESCRIPTION OF THE DRAWINGS

The present invention has other objects, features and advantages which are in addition to those mentioned above, and all such objects, features and advantages will become more clearly apparent in connection with the following detailed description of a preferred embodiment, taken in conjunction with the appended drawings in which:

FIG. 1 is a schematic view showing the present invention deployed on the bottom of a body of water;

FIG. 2 is a side view of the present invention showing various details of the construction;

FIG. 3 is a cross-sectional view of the stop assembly for each disc; and

FIG. 4 is a more detailed schematic view of the habitat assembly on bottom.

DETAILED DESCRIPTION OF A PREFERRED EMBODIMENT

Referring initially in FIG. 1, a fish habitat assembly 10 in accordance with this invention is shown on the bottom 11 of a body of water 12 such as a lake or reservoir. The assembly 10 has been deployed from a boat 13 by dropping the same over the side. The assembly 10 includes a plurality of discs 15-17 which are coupled to a flexible stress member 18. The lower end of the member 18 is attached to an anchor 14, so that the weight provided by the anchor causes the assembly 10 to sink to bottom. Once the anchor 14 is on bottom, each of the discs 15-17, which has a specific gravity less than 1, attempts to float upward. However the anchor 14 and the stress member 18 hold the discs 15-17 down so that they each assume a horizontal position, and are in vertically spaced relationship as shown in FIG. 1.

As shown in more detail in FIG. 2, each of the discs 15-17 is circular and has a central aperture 20 through which the stress member 18 extends. As noted above, each disc preferably is made of a relatively rigid, closed-cell foam plastic board which has a specific gravity less than 1.0. Stop blocks 21-23 are attached to the stress member 18 at longitudinally spaced points therealong. The respective blocks engage upper annular surfaces on the upper sides of the respective discs 15-17 which are concentric with the centerlines of the apertures 20. The lower portion 25 of the stress member 18 extends substantially below the lower disc 17 and is provided with a loop 26 and a hook 27 by which the assembly can be secured to the anchor 14 (FIG. 1).

The structural details of one of the stop blocks, for example block 22, is shown in FIG. 3. The block 22 has a generally frusto-conical shape to provide an enlarged area lower surface 30 and a reduced area upper surface 31. A counterbore 32 is formed in the upper portion of the block 22, bearing a transverse wall 33 which has a central opening 34 through which the stress member 18 passes. The opening 34 has a diameter which provides a fairly tight fit around the stress member 18, as does the aperture 20 in disc 16. Thus the stop block 22 is maintained centered over the aperture 20, which is formed in the exact center of the disc 16.

To hold the block 22 against upward movement on the stress member 18 in response to the tendency of the disc 16 to float, various means can be used. For example a stainless steel sleeve or lug 36 can be slipped over the stress member 18 and crimped thereto at 37. To ensure coaxial alignment of the sleeve 36 with the opening 34 and the disc aperture 20, the sleeve can be held centered in the counterbore 32 and then epoxied therein as shown at 38. As an alternative to the metal sleeve 36, a plastic sleeve can be used which is epoxied or potted in the center of the counterbore 32. Other stop means can be used so long as the construction ensures that the lower surface 30 of the block 22 is at a right angle to the stress member 18, which ensures that the disc 16 will float in the horizontal. The stop means for the other discs 15 and 17 are identical to that shown in FIG. 3 and described above.

OPERATION AND USE

In operation, the complete habitat assembly 10, except for the anchor 14 which is attached later, can be collapsed into a small, flat package which is light weight and easy to handle. This feature allows the assembly 10 to be easily transported by auto and then by boat to a location where it will be deployed. To set the habitat 10, the lower end of the lanyard or stress member 18 is secured to the anchor 14 by the eye hook 27, and then the assembly is dropped overboard the boat 13. The weight of the anchor 14 will take the assembly 10 to the bottom 11. After the anchor 14 hits bottom, the discs 15–17, on account of their tendency to float, will automatically take up their horizontally disposed, vertically spaced positions as shown in the drawings. The coaxial alignment of the stop sleeves 36 with the longitudinal axes of the bores 34 in the stop blocks 21 and the apertures 20 in the respective discs 15–17 ensures that each of the discs floats horizontal or parallel to the surface of the water, rather than tilted.

As shown in FIG. 4, the spaces 40–42 below and between the discs 15–17 provide a shadowed or darkened region which attracts aquatic life including fish. Since the habitat 10 is made of materials which will not rust or deteriorate under water, the structure of the present invention provides a habitat that will last for the long term, compared to brush or the like.

The number of discs, and the diameter thereof, may be varied for different water areas or conditions. For example the number of discs can range from one (1) to about six (6), and their diameter can range from about 24–48 inches. Each disc has a circular shape and is held in place on the stress member 18 only at its center. This arrangement makes it extremely difficult to hook or snag any part of the assembly 10 with fish hooks or lures. Each of the discs 15–17 preferably is fabricated out of $\frac{1}{8}"-\frac{1}{2}"$ thick plastic or other material with a specific gravity less than 1.0 which enables it to float and thus keep the stress member 18 under low tension which causes the assembly to stand upright as shown in FIG. 5 and to cast a maximum amount of shadow.

It now will be recognized that a new and improved artificial fish habitat has been disclosed. Since certain changes or modifications may be made in the disclosed embodiment without departing from the inventive concepts involved, it is the aim of the appended claims to cover all such changes and modifications falling within the true spirit and scope of the present invention.

What is claimed is:

1. An artificial aquatic life habitat, comprising: at least one generally circular disc member having a specific gravity of less than one, said member having an aperture in the center thereof and an upper surface surrounding said aperture; a block member arranged to engage a symmetrical portion of said upper surface adjacent said aperture, said block member having a bore formed in the upper end thereof and an opening which is in axial alignment with said aperture in said disc member; a flexible stress member extending through said aperture, said opening and said bore, said stress member having close-fitting relation with said opening and said aperture; and stop means positioned in said bore for preventing upward movement of said block member and said disc member along said stress member, so that flotation forces on said disc underwater cause it to remain in a horizontal position when said stress member is anchored to the bottom of a body of water.

2. The habitat of claim 1 further including said stress member having a lower end, and means for connecting said lower end to an anchor which holds said habitat on bottom.

3. The habitat of claim 1 further including anchor means for holding said habitat on bottom; and means for connecting said anchor means to said stress member.

4. The habitat of claim 1 wherein said stop means includes a sleeve member that is fixed to said stress member, said sleeve member having an outer diameter that is less than the inner diameter of said bore; and further including means for centralizing and securing said sleeve member in said axial bore.

5. The habitat of claim 1 wherein said block member has a transverse wall defining the lower end surface of said bore, said opening extending through said wall, said stop member engaging said end surface to prevent said upward movement.

6. An artificial habitat for providing shelter and darkness to aquatic life such as fish, comprising: a plurality of generally circular, flat disc members having upper and lower sides and being spaced at predetermined distances apart and arranged parallel to one another, each of said disc members having a specific gravity less than one and an aperture in the center thereof; block means mounted on the upper sides of each of said disc members adjacent said apertures, each of said block means having an enlarged diameter central bore and a reduced diameter opening which is axially aligned with said central bore; flexible stress means extending through said apertures, said opening and said bores and in close fitting relationship to said apertures and said openings; and stop means in each of said bores and fixed to said stress member for preventing upward movement of an associated block means and disc member and for maintaining the vertical spacing of said disc members underwater.

7. The habitat of claim 6 wherein said stress member has means at its lower end for attaching said habitat to an anchor by which the habitat is held on bottom.

8. The habitat of claim 7 further including anchor means connected to said attaching means for holding said habitat on bottom.

9. The habitat of claim 6 wherein each of said stop means includes a sleeve member, the inner diameter of each of said bores being greater than the outer diameter of a respective sleeve member; and further including means for centralizing each of said sleeves in said bores so that the lower end surfaces of said sleeves are parallel to the upper sides of said discs.

10. The habitat of claim 6 wherein each of said block means has a generally frusto-conical shape providing a larger diameter end surface, said larger diameter end surface engaging the upper side of a respective disc member in order to stabilize said disc members in their horizontal positions.

* * * * *